United States Patent [19]

Childers

[11] Patent Number: 5,046,819
[45] Date of Patent: Sep. 10, 1991

[54] OBJECTIVE LENS SUPPORT HAVING ROTARY AND AXIAL MOTIONS FOR USE IN AN OPTICAL DISK APPARATUS

[75] Inventor: Edwin R. Childers, Tucson, Ariz.

[73] Assignee: International Business Machines Corporation, Armonk, N.Y.

[21] Appl. No.: 509,393

[22] Filed: Apr. 16, 1990

[51] Int. Cl.$^5$ .............................................. G02B 7/02
[52] U.S. Cl. .................................. 359/814; 359/824; 369/44.15
[58] Field of Search ............... 350/245, 247, 255, 257, 350/252; 369/44.14–44.16

[56] References Cited

U.S. PATENT DOCUMENTS

| | | | |
|---|---|---|---|
| 4,419,614 | 12/1983 | Kimura | 350/247 |
| 4,482,988 | 11/1984 | Tsurushima et al. | 369/45 |
| 4,679,903 | 7/1987 | Kasahara et al. | 350/247 |
| 4,715,024 | 12/1987 | Musha | 369/44 |
| 4,767,187 | 8/1988 | Gijen et al. | 350/247 |
| 4,790,628 | 12/1988 | Nanno et al. | 350/247 |
| 4,796,248 | 1/1989 | Ozaki et al. | 369/45 |
| 4,817,076 | 3/1989 | Van Sluys et al. | 369/45 |

FOREIGN PATENT DOCUMENTS 60-38738 2/1985 Japan .
62-36739 2/1987 Japan ................. 369/44.15
2-66740 3/1990 Japan ................. 350/245

Primary Examiner—Bruce Y. Arnold
Assistant Examiner—James Phan
Attorney, Agent, or Firm—H. F. Somermeyer

[57] ABSTRACT

A rotary objective lens support having a predetermined tolerance to parasitic vibrations enables rapid focussing and track following and track changing motions. The rotary support is a beam having a central aperture for slidably and rotatably receiving a pivot pin. A pair of apertures on laterally opposite sides of the central aperture receive motion actuating U-shaped magnets. A lens is mounted on one end portion of the beam and a position indicator is mounted on the opposite end portion of the member. A base, which includes the pivot pin and U-shaped magnets, has a position-sensing means for sensing the rotational position of the member. A pair of outside walls extend past and partially form the magnet receiving apertures. The walls are shaped to reduce effects of parasitic vibrations. In one embodiment, the lens and position indicator are mounted on axially offset end portions; the walls extend between the end portions such that an oblique surface is formed on each of the walls. This shape of the walls provides the reduction of parasitic vibrations.

12 Claims, 2 Drawing Sheets

OBJECTIVE LENS SUPPORT HAVING ROTARY AND AXIAL MOTIONS FOR USE IN AN OPTICAL DISK APPARATUS

FIELD OF THE INVENTION

The present invention relates to optical disk recorders and more particularly to an objective lens mount.

BACKGROUND OF THE INVENTION

Optical disk recorders use an objective lens to focus a laser beam onto a record medium and for transmitting a reflected laser beam from the medium to the detector apparatus for use in controlling the focusing, track seeking and following and data readback for the optical disk player. Such objective lens supports have taken various shapes, forms, and designs. These supports enable the laser beam to be tracked along a record track of a disk or plate medium as well as for moving the beam from one track to an adjacent track. Axial motion of the actuator is used for focusing control. An important aspect of any of these actuators is that they exhibit a sufficiently high resonant frequency such that parasitic vibrations do not interfere with either the focusing or the so-called track following or seeking operations.

The present invention concerns an objective lens holder which provides the track following and seeking functions through rotary motions and the focusing control through actual motions. This general type of objective lens holder is known in the art. For example: in Tsurushima et al., U.S. Pat. No. 4,482,988 shows such an actuator wherein an objective lens is supported on a radially extending beam which is rotatable about an axis and is axially movable parallel to such axis. This patent also shows a tubular cylinder supporting an objective lens having a slightly different arrangement wherein the support is a series of concentric cylinders with the objective lens being off center from the center of rotation of the cylinder. It is desired to provide a higher performance objective lens support not shown in this reference by reducing the inertia of the actuator i.e., reducing the mass at a radially extremity from the center of rotation.

Kasahara et al., in U.S. Pat. No. 4,679,903 shows such a rotary objective lens support having a peripheral vibration damper. It is desired to provide vibration elimination without increasing the inertia of rotation of the objective lens support. The objective lens support shown in this reference includes a cup-shaped cylinder with radially extending arms for supporting an objective lens. It is desired to provide a simpler support which is moldable and yet provides high resonant frequency for high performance operations.

Musha in U.S. Pat. No. 4,715,024 shows a rotary axially-moveable objective lens support in which the objective lens is mounted on a radially extending arm which results in an imbalance in the rotation i.e., all of the inertia is on one radius of the objective lens support; it is desired to provide a balanced lens support holder which is of simple construction.

Gijzen et al., in U.S. Pat. No. 4,767,187 shows a balance objective lens support of the rotary type which is also axially slidable. The balancing is achieved through a complex construction which is desired to be avoided.

Nanno et al., U.S. Pat. No. 4,790,628 shows a rotary objective lens support in which the lens is mounted on an extending radially arm. FIG. 9 of this reference shows a gain and phase chart wherein no vibrations are induced into the rotary lens support up to 10,000 Hertz. It is noted that the center support is a relatively large cylinder which adds to the rotational inertia of the objective lens holder. It is desired to provide a more compact objective lens holder which will facilitate higher frequencies of operation such as above 20,000 Hertz.

Ozaki et al., in U.S. Pat. No. 4,796,248 shows another cylindrical actuator wherein the objective lens is mounted offset from the center of rotation of the cylindrical or tubular assembly. Pan Sluys et al., in US Patent 4,817,076 shows another actuator having a large number of products in the assembly which is desired to be avoided.

Japan published unexamined patent application 60-38738 is another showing of the actuator of Musha et al. supra.

SUMMARY OF THE INVENTION

In accordance with the invention, a rotary axially slidable objective lens support or rotary actuator has a beam-shaped frame with a central pivot axis transfers to the length of the beam. An objective lens is positioned at one distal end of the beam and a rotary position sensor is positioned at the opposite distal end of the beam. The elongated beam is axially off-set along the length such that the objective lens is in a different plane than the rotary position sensor for facilitating accessing optical disks contained in a cartridge. In the transition between the planes, tapered walls at the lateral outward wall edges of the beam join the beam portions in the two different planes in a matter for enhancing the resonant frequency characteristics of the rotary actuator in both the rotary and axially slidable directions and motions. Resonant frequency of the assembly is increased in both the rotary and focusing motion directions.

The foregoing and other objects, features and advantages of the invention will be apparent from the following more particular description of preferred embodiments of the invention, as illustrated in the accompanying drawings.

DETAILED DESCRIPTION

Figure 1:
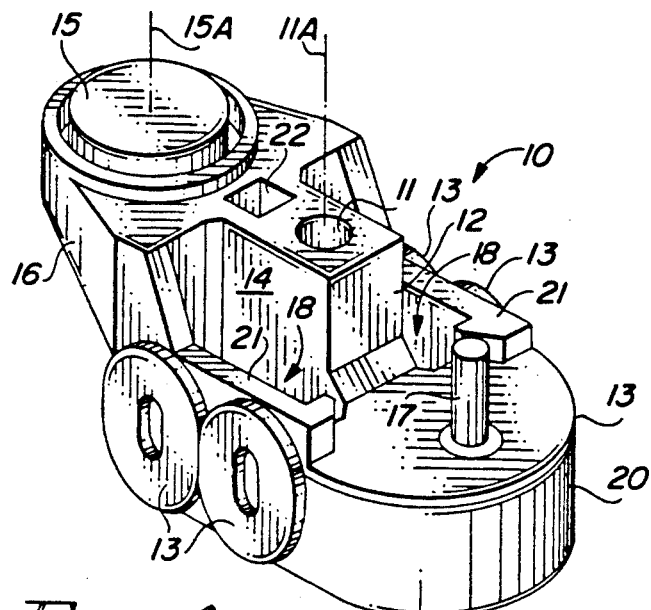
FIG. 1 is a showing of a prior art actuator which has similar constructional features as the actuator of the present invention.

Referring now particularly to the drawings, like numerals indicate like structural features of the invention. A prior art actuator 10 is shown in FIG. 1. The rotary actuator 10 includes a central axially extending aperture 11 for receiving a pivot pin for enabling rotation of the actuator 10 about pivot axis 11A, as well as providing slidable focusing motions in the direction of pivot axis 11A. A central boss 12 extends transversely to the length of the actuator 10. Sets of coils 13 are mounted on the longitudinally outwardly facing walls 21 of actuator 10. Both focusing and tracking coils are suitable mounted on the actuator. A pair of apertures 18 between central boss 12 and the outer walls 21 movably receive a pair of later described magnets for co-action with the focusing and tracking coils 13. Outwardly facing walls 14 of central boss 12 are positioned to allow limited rotational motion of actuator 10 for permitting the tracking functions. An objective lens 15 having an optical axis 15A extending parallel to pivot axis 11A is mounted in an end portion 16 of the actuator 10. The objective lens 15 is in the first plane extending perpendicular to pivot axis 11A. At the opposite end portion 20 of the beam shaped actuator 10, an upstanding pin 17 provides for indication of rotary position of the actuator 10. Upstanding pin 17 is mounted on a second plane 20A axially displaced from the first plane 26A having objective lens 15. This axial offset facilitates moving lens 15 closer to a disk contained in a cartridge which is accessed through a window in the cartridge (not shown). A pair of outer walls 21 and central hub portion 12 connect the two end portions of the beam shaped actuator. Tests using the FIG. 1 illustrated actuator indicated that the resonant frequency characteristics and other parasitic vibration problems prevented the use of the actuator from providing desired high performance. Later described comparative tests between the FIG. 1 illustrated construction and the next described FIG. 2 illustrated construction will show that advantageous of using the construction of the present invention over the FIG. 1 illustrated prior art.

Figure 2:
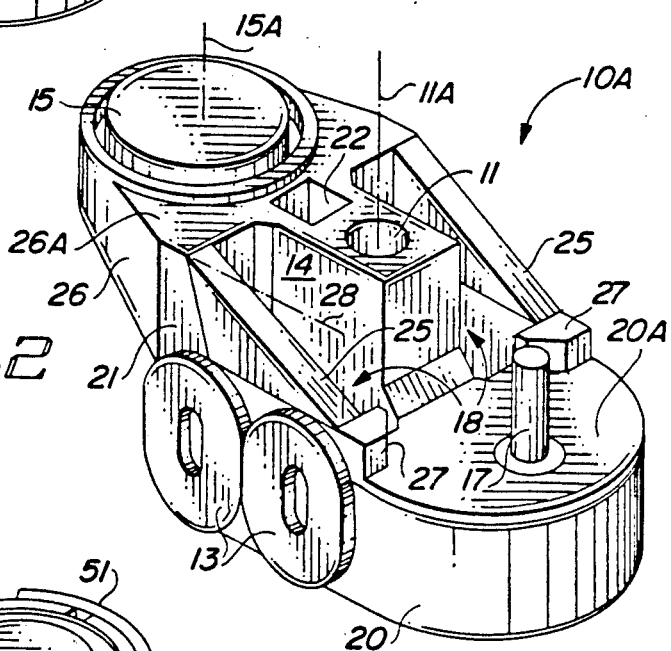
FIG. 2 shows the actuator of the present invention in isometric metric form.

In accordance with the invention, connecting walls 21 were changed by inserting wall portions 25 having a smooth surface extending from the upper surface 26A of end portion 26 to upper surface 20A of end portion 20 all as seen in FIG. 2. A pair of bosses 27, which are a portion of walls 21, terminate the wall portions 25, therefore the wall portions 25 terminate in a slight axial displacement from surface 20A. This displacement from the surface 20A was found not to interfere with the reduction of undesired vibrations. Dash lined box 28 illustrates a rectangle representing a volume between the upper surface 26A and the upper portion of boss 27 on lower surface 20A. It is seen that wall portions 25 fill up one half of the rectangular area and provide a smooth surface between upper surface 26A and lower surface 20A. The axially extending aperture 22 apparently was to facilitate molding the actuator. Vibration reduction was provided by the exterior walls 25 which longitudinally extend between the end portion 26 and the end portion 20 of the beam shaped actuator.

Figure 3:
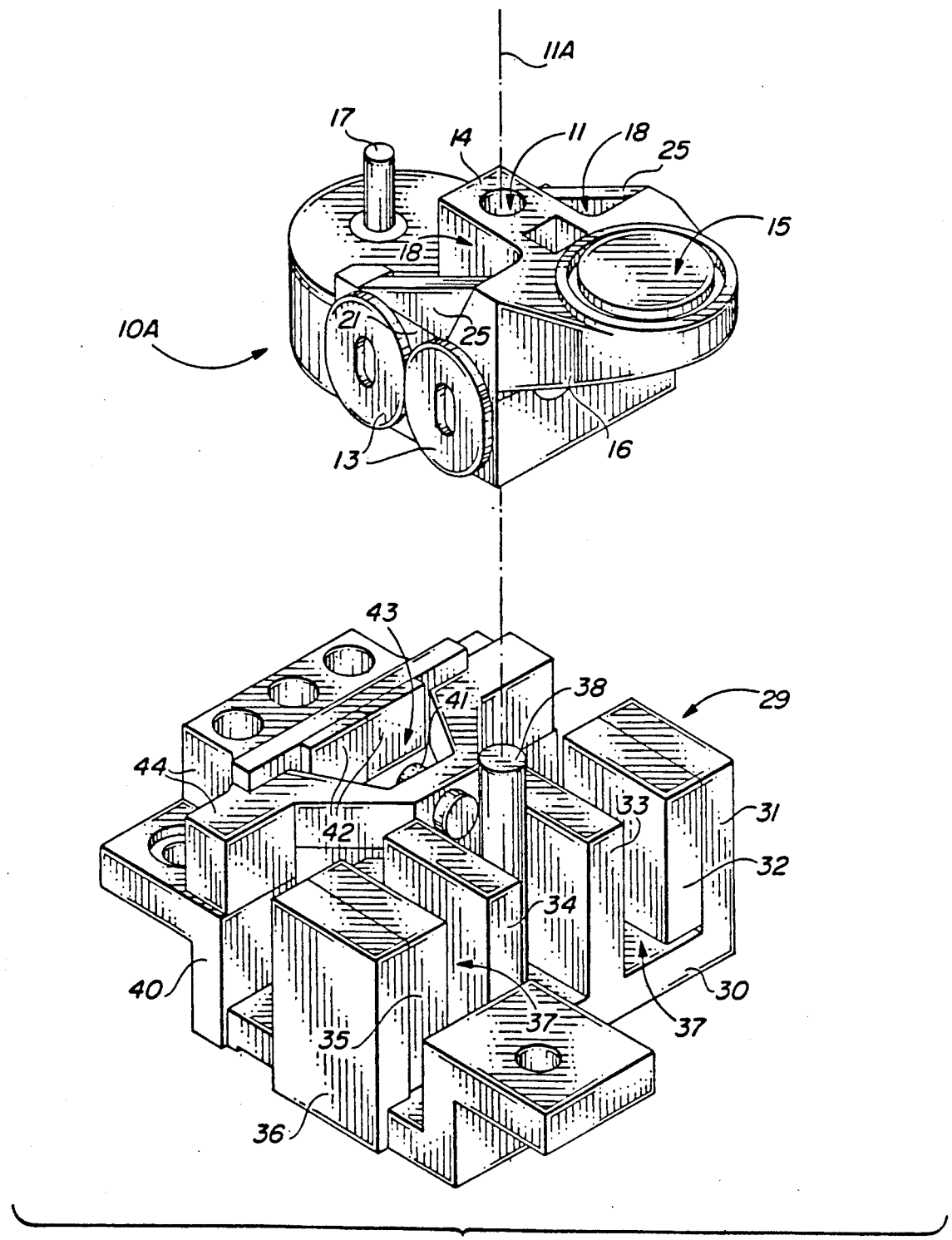
FIG. 3 shows an assemblage of the rotary actuator and its base support for providing an objective lens support assembly having both focusing and tracking directions of motion.

FIG. 3 illustrates the relationship of the actuator 10A as shown in FIG. 2 with a base support 29. Base support 29 includes an E shaped upwardly-opening magnetically-permeable member 30 having upstanding arms 31, 33, 34, and 36. A pair of magnets 32 and 35 are suitable mounted on the upstanding arms 31 and 36 respectively. Upstanding arms 33 and 34 extend into apertures 18 of actuator 10A, respectively. Upstanding pivot pin 38 extends through pivot aperture 11 for providing rotary and axially slidable support to actuator 10A. The interstices 37 between the magnets 32, 35 and the upstanding arms 33, 34, respectively receive the arm 21 of the actuator. The spacing of the arms and aperture 18 is such that limited pivoting motion is permitted when actuator 10A is slidable mounted on pivot pin 38.

A rotary position sensor assembly is mounted on a frame 40 which extends generally parallel to the magnet assembly 31-36. A light emitting diode 41 is mounted to supply a light toward a pair of photo sensing diodes 42. Gap 43 between light emitting diode 41 and a photo sensing diode 42 receives position indicating pin 17. The assembly of the apparatus of FIG. 3 first places a rotary actuator 10A over pivot pin 38, then position-sensing assembly 40-44 is added such that position indicating pin 17 goes into gap 43. Note that the lower part of frame 40 is affixed to the magnet assembly with the portions of 44 supporting elements 41 and 42 are then afixed to the assemblage.

Comparative tests were performed on the FIG. 1 and FIG. 2 illustrated actuators. The FIG. 3 illustrated assembly was rigidly mounted to a twelve millimeter thick aluminum plate for analysis. This provides a well behaved and repeatable test stand so that the dynamics of the illustrated actuators could be isolated from the supporting structures shown in FIG. 3.

TABLE

FIG. 1 and FIG. 2 Test Results
(all values are in KHz)

Figure 4:
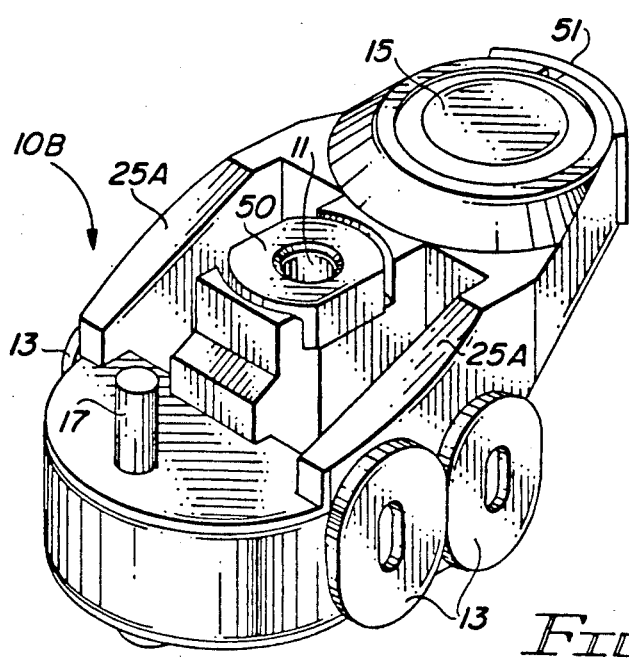
FIG. 4 shows an improved actuator made after testing the FIG. 1 and FIG. 2 illustrated actuators.

|        | BANDWIDTHS |          | RESONANCES |          |
|--------|------------|----------|------------|----------|
|        | FOCUS      | TRACKING | FOCUS      | TRACKING |
| FIG. 1 | 1.27       | 3.26     | 20.1       | 33       |
| FIG. 2 | 1.53       | 5.64     | 23         | 43.5     |
| Molded | 1.44       | 4.82     | 23         | 37.5     |
| FIG. 4 | 1.85       | 5.02     | - No tests - |        |

The above FIGURES are averages of 15 actuators for FIG. 1 and 4 actuators for FIG. 2. The FIG. 2 actuators had the walls 25 adhesively secured by an Epoxy resin. Two molded actuators using the FIG. 2 structure were used in the tests labeled "molded". The FIG. 4 line shows the test result average for 98 test specimens. Numbers are averages.

FIG. 4 shows and actuator which has a beam length shorter than the beam lengths of FIGS. 1 and 2, i.e. the distance between pivot pin receiving aperture 11, the lens 15 and pin 17 are shortened. This change provides some enhancement in performance but nothing like the performance enhancement by added walls 25A. In FIGS. 1 and 2, the walls 21 and 25, respectively, were parallel; in FIG. 4 walls 25A slant inwardly toward pin 17 (not parallel). A hardened pivot pin bearing 50 is at one end of pivot pin aperture 11, it can extend the length of the aperture or two bearings can be used, one at each end portion of the aperture. For enhancing focussing operations, a vibration damper 51 is adhesively secured to the actuator 10B adjacent lens 15. Any resilient adhesive can be used. The damper mass in one test was a lead tape; other materials less toxic may be used. While the invention has been particularly shown and described with reference to preferred embodiments thereof, it will be understood by those skilled in the art that various changes in form and details may be made therein without departing from the spirit and scope of the invention.

What is claimed is:

1. A rotary actuator for use in an optical disk player for carrying an objective lens;
including, in combination:
an elongated beam having a lens aperture in a first end portion of the beam and having an optical axis extending through the lens aperture, said first end portion having upper and lower surface means extending in respective planes which are transverse to said optical axis;
the elongated beam having a pivot aperture in a central portion of the beam and having a pivot axis extending through the pivot aperture, said central portion having an upper surface means having a surface portion extending transverse to the pivot axis and having a surface portion in a plane juxtaposed to the upper surface means of said first end portion and lower surface means extending in a plane transverse to said pivot axis and being displaced from the lower surface means of said first end portion;

the elongated beam having a pair of rectangular apertures each having an magnet axis and the pair of rectangular apertures respectively extending longitudinally of the elongated beam to be longitudinally co-extensive with the central portion and with said pivot aperture being disposed therebetween;

the elongated beam having a lower portion with position indicating means located at a second longitudinal end portion of the elongated beam opposite to said first end portion, an upper surface means extending in a plane transverse to said optical axis and displaced from said upper surface means of said first end portion along the optical axis toward said lower surface means of said first end portion;

a pair of spaced-apart longitudinally extending walls on the beam extending through said central portion between said first and second end portions, a lower surface of each of said walls being a portion of the lower surface means of said central portion and an upper surface of each of said walls extending between the upper surface means of said first and second end portions such that the walls each have side walls with a area of at least one-half of an area defined as a rectangle formed by the upper surface means of said first and second end portions and the boundaries between said central portion and both said end portions; and said pivot and optical axes being substantially parallel to each other.

2. In the apparatus set forth in claim 1 further including, in combination:
said upper surfaces of said walls extending between said upper surface means of said first and second end portions in a straight line.

3. In the apparatus set forth in claim 2 further including, in combination:
a pair of coils mounted on outwardly facing side surfaces of said walls and another coil mounted on the actuator having a magnetic axis coincident with said pivot axis.

4. In the apparatus set forth in claim 3 further including, in combination:
said position indicating means includes an upstanding member extending upwardly from the upper surface means of said lower portion and being parallel to said pivot axis.

5. In the apparatus set forth in claim 1 further including, in combination:
the actuator having a predetermined resonant frequency and with said walls removed from the actuator exhibiting a predetermined resonance at said predetermined resonant frequency; and
said walls lowering the predetermined resonance of the actuator at said resonant frequency by about 20 db.

6. In apparatus for rotatably supporting an objective lens to be used in an optical disk player, including, in combination:

an elongated beam having a central pivot aperture extending in a first direction along a pivot axis;
a first end portion of the elongated beam extending from said pivot aperture to one end of the longitudinal beam and a second end portion of the elongated beam extending from said pivot aperture to a second end of the longitudinal beam, said first and second ends being opposite ends of the beam;
said end portions including displaced sections that are offset from each other in a direction along the pivot axis;
the longitudinal beam having a pair of magnet apertures disposed on opposite lateral sides of the pivot aperture and extending through the longitudinal beam parallel to said pivot axis for movably receiving magnet means, outside wall means disposed to be longitudinally co-extensive with said magnet apertures and extending between surfaces of said end portions that are offset in the direction of the pivot axis such that the outside wall means each have at least one surface coextensive with the magnet apertures and extending in a signal plane disposed at a predetermined angle of less than 90 degrees with respect to the pivot axis between like facing surfaces of said displaced sections; and
means in the apparatus for holding an objective lens in a first one of said displaced sections and a position indicator on a second one of said displaced sections.

7. In the apparatus set forth in claim 6 further including, in combination:
said apparatus being a unitary body; and
means on the body for supporting magnetic coils which are transversely disposed for effecting magnetic fields in mutually perpendicular magnetic axes wherein one of the axes is coincident with said pivot axis.

8. In the apparatus set forth in claim 7 further including, in combination:
said lens support means is closer to said pivot axis than said position indicator.

9. In the apparatus set forth in claim 8 further including vibration damping means secured to the first one of said displaced sections of the unitary body.

10. In apparatus for rotatably supporting an objective lens in an optical disk player, including, in combination:
a base for being mounted in an optical disk player, said base having a pair of spaced-apart upstanding U-shaped magnet means each of the magnet means having a pair of upstanding legs such that one leg of one magnet means is spaced from one leg of a second magnet means a predetermined distance;
an upstanding pivot pin secured to the base and being disposed between said pair of magnet means;
position sensing means on the base and being disposed on one side of and spaced from said pair of magnet means and having a sensing aperture for receiving a position indicator;
a rotary member for rotatably supporting an objective lens to be used in the optical disk player comprising an elongated beam having a central pivot aperture extending in a first direction along a pivot axis and said pivot pin being slideably and rotatably disposed in said pivot aperture for rotatably supporting said rotary member on the pivot pin;
a first end portion of the elongated beam extending from said pivot aperture to one end of the longitudinal beam and a second end portion of the elongated beam extending from said pivot aperture to a second end of the longitudinal beam, said first and second ends being opposite ends of the beam:

said end portions including displaced sections that are offset from each other in a direction along the pivot axis;

the longitudinal beam having a pair of magnet apertures disposed on opposite lateral sides of the pivot aperture and extending through the longitudinal beam parallel to said pivot axis for movably receiving magnet means, outside wall means disposed to be longitudinally co-extensive with said magnet apertures and extending between surfaces of said end portions that are offset in the direction of the pivot axis such that the outside wall means each have at least one surface coextensive with the magnet apertures and extending in a signal plane disposed at a predetermined angle of less than 90 degrees with respect to the pivot axis between like facing surfaces of said displaced sections; and means in the apparatus for holding an objective lens in a first one of said displaced sections and a position indicator on a second one of said displaced sections such that the position indicator is disposed in said sensing aperture whenever said pivot pin is disposed in said pivot aperture.

11. In the apparatus set forth in claim 10 further including, in combination:

said position sensing means being disposed on said base along a first axis intersecting said pivot pin, said magnet means being respectively disposed on opposite sides of said first axis and said legs of said magnet means being elongated in a direction parallel to said first axis;

said position sensing means including a light emitting semiconductive device on one side of said sensing aperture and a photo detector on an opposite side of said sensing aperture and facing said light emitting semiconductive device; and coil means on the rotary member for being electrically actuated to move the rotary member in axial sliding directions and rotational directions with respect to the pivot pin pivot axis.

12. In the apparatus set forth in claim 11 further including vibration daming means secured to the first one of said displaced sections of the actuator.

* * * * *